S. W. PARSONS.
THREADED MEMBER.
APPLICATION FILED SEPT. 22, 1914.

1,203,546.

Patented Oct. 31, 1916.

WITNESSES:

INVENTOR.
Stuart W. Parsons:
BY
ATTORNEY.

UNITED STATES PATENT OFFICE.

STUART W. PARSONS, OF NEW BRITAIN, CONNECTICUT, ASSIGNOR TO THE STANLEY WORKS, OF NEW BRITAIN, CONNECTICUT, A CORPORATION OF CONNECTICUT.

THREADED MEMBER.

1,203,546.   Specification of Letters Patent.   Patented Oct. 31, 1916.

Application filed September 22, 1914. Serial No. 863,017.

*To all whom it may concern:*

Be it known that I, STUART W. PARSONS, a citizen of the United States, and a resident of New Britain, in the county of Hartford and State of Connecticut, have invented certain new and useful Improvements in Threaded Members, of which the following is a specification.

The object of this invention is to provide a novel form of a threaded member, or as it possibly may better be termed, a thread substitute.

The invention is particularly adapted for use in connection with parts made from sheet metal, and which it is desired to secure by threaded connection. The invention is adapted for use either as the male or female member of a threaded connection, and the complementary part is preferably of the usual continuous screw thread type.

Figure 1:
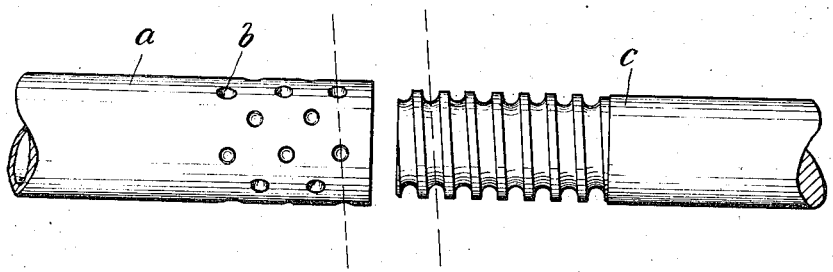
Figure 2:
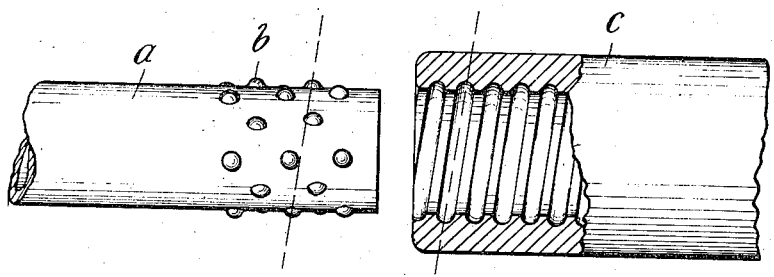
Figure 3:
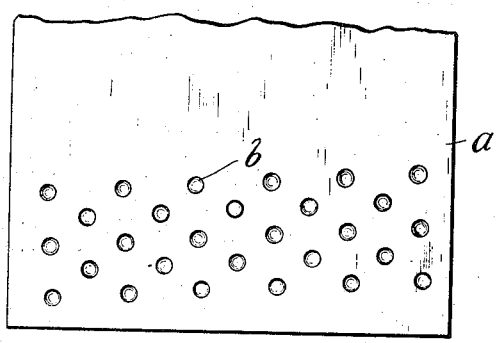

In the drawings—Figure 1 shows the invention embodied in the female member of a threaded connection. Fig. 2 shows it embodied in the male member. Fig. 3 shows a flat sheet metal blank prepared ready to be rolled into tubular shape.

The invention consists in providing a plain tubular member with a series of spirally arranged projections, the distance between the adjacent convolutions corresponding to the pitch of the threaded portion of the complementary member.

The invention will be described as applied to a member made from sheet metal and by reference to Fig. 3 it will be seen that a sheet of metal is selected of proper width so that when rolled into tubular form it will have the proper diameter. Into this sheet near one end and transversely thereof, there are formed several rows of small rounded projections and in such arrangement with respect to one another that when the sheet is rolled into tubular form these projections will have a spiral arrangement on the cylinder, extending either outwardly or inwardly, depending upon whether the member is to be used as a male or female part. As the invention has been practised only one member of the threaded connection has been formed in this way, the other being the usual continuous screw thread type.

In Fig. 1, *a* denotes a tubular member made in accordance with my invention, and *b* denotes the projections which in this case are on the interior of the cylinder, constituting this member a female part. *c* denotes the complementary male part, which as shown is of the usual continuous screw thread type.

In Fig. 2, the member formed in accordance with this invention is of the male type, the projections *b* being on the outside, and the complementary member *c* being the female member.

In Fig. 3, the flat sheet metal blank will be seen, provided with the projections *b*, and ready to be rolled up into tubular form.

It is to be noted that the projections —*b*— are substantially hemispherical so that binding or cutting action of assembled parts will be entirely eliminated when the member —*a*— has the projections —*b*— threaded into the threads of the complementary member —*c*—.

In accordance with this invention an extremely simple and inexpensive form of a threaded member is provided, which may be accurately fitted to any complementary threaded member and form an extremely efficient connection therewith. The invention can be used with solid materials either by casting or punching the projections, but finds its greatest utility in connection with sheet material, since the thread equivalent can be formed while the metal is flat by a simple punching or rolling operation, and the flat metal then be rolled to shape without distorting the thread equivalent in any manner.

I am aware that the invention is susceptible of various embodiments and I do not wish it to be understood that the invention is limited either to the material to be employed or to the manner of forming the thread equivalent.

I claim as my invention:—

A coupling including a threaded member, and a member provided with a plurality of spirally arranged projections operatively associated with the screw threads, the projections being of even height throughout and substantially hemispherical to eliminate binding and cutting action of the parts.

STUART W. PARSONS.

Witnesses:
  J. P. HOLTZHOUSER,
  W. E. DOANE.